(12) United States Patent
Niihara et al.

(10) Patent No.: US 11,061,129 B2
(45) Date of Patent: Jul. 13, 2021

(54) DISTANCE ESTIMATION DEVICE, DISTANCE ESTIMATION METHOD AND PROGRAM

(71) Applicant: PIONEER CORPORATION, Tokyo (JP)

(72) Inventors: Ryoko Niihara, Kanagawa (JP); Masahiro Kato, Kanagawa (JP); Hitoshi Kaneko, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 248 days.

(21) Appl. No.: 16/065,916

(22) PCT Filed: Dec. 25, 2015

(86) PCT No.: PCT/JP2015/086341
§ 371 (c)(1),
(2) Date: Jun. 25, 2018

(87) PCT Pub. No.: WO2017/109978
PCT Pub. Date: Jun. 29, 2017

(65) Prior Publication Data
US 2018/0372858 A1 Dec. 27, 2018

(51) Int. Cl.
*G01C 22/00* (2006.01)
*G01S 13/58* (2006.01)
(Continued)

(52) U.S. Cl.
CPC .............. *G01S 13/581* (2013.01); *G01C 3/22* (2013.01); *G01C 22/00* (2013.01); *G01S 5/14* (2013.01);
(Continued)

(58) Field of Classification Search
CPC ......... G01C 22/00; G01C 3/22; G01S 13/581; G01S 17/42; G01S 17/58; G01S 17/86;
(Continued)

(56) References Cited

U.S. PATENT DOCUMENTS 8,027,761 B1  9/2011 Nelson
2010/0013697 A1* 1/2010 De Waard ............... G01S 13/66
                                                          342/59
(Continued)

FOREIGN PATENT DOCUMENTS

JP    2008-008783 A   1/2008
JP    2008-51573 A    3/2008
(Continued)

OTHER PUBLICATIONS

Jurisica, L., et al., Triangulation of Mobile Robot Position with Detected Inherent Environment Landmarks, International Journal of Mechanics and Control, vol. 10, Dec. 1, 2009, Torino, Italy, p. 15-25.
(Continued)

*Primary Examiner* — Timothy A Brainard
(74) *Attorney, Agent, or Firm* — Procopio, Cory, Hargreaves & Savitch LLP

(57) ABSTRACT

The distance estimation device acquires distances from a movable body at a first time and a second time to two ground objects, respectively, and acquires a distance between the two ground objects. Then, the distance estimation device
(Continued)

calculates a moving distance of the movable body from the first time to the second time based on the acquired results. Thus, the distance estimation device calculates the moving distance of the movable body using arbitrary ground objects measurable from the movable body.

11 Claims, 14 Drawing Sheets

(51) Int. Cl.
  *G01S 17/58*  (2006.01)
  *G01S 7/48*  (2006.01)
  *G01C 3/22*  (2006.01)
  *G01S 5/16*  (2006.01)
  *G06T 7/571*  (2017.01)
  *G01S 17/42*  (2006.01)
  *G01S 17/86*  (2020.01)
  *G06T 7/73*  (2017.01)
  *G01S 5/14*  (2006.01)

(52) U.S. Cl.
  CPC .............. *G01S 5/16* (2013.01); *G01S 7/4808* (2013.01); *G01S 17/42* (2013.01); *G01S 17/58* (2013.01); *G01S 17/86* (2020.01); *G06T 7/571* (2017.01); *G06T 7/73* (2017.01); *G06T 2207/10016* (2013.01); *G06T 2207/30261* (2013.01)

(58) Field of Classification Search
  CPC . G01S 5/14; G01S 5/16; G01S 7/4808; G06T 2207/10016; G06T 2207/30261; G06T 7/571; G06T 7/73
  See application file for complete search history.

(56) References Cited

U.S. PATENT DOCUMENTS

| | | | |
|---|---|---|---|
| 2011/0320256 A1* | 12/2011 | Florucci ................. | G08G 1/127 705/14.33 |
| 2014/0046587 A1 | 2/2014 | Rintanen | |
| 2015/0025839 A1* | 1/2015 | Lee ........................... | G01S 5/00 702/150 |
| 2015/0081211 A1 | 3/2015 | Zeng et al. | |
| 2016/0282128 A1 | 9/2016 | Zeng et al. | |
| 2016/0313451 A1 | 10/2016 | Rintanen | |
| 2016/0377709 A1* | 12/2016 | Wang ...................... | G01S 11/10 342/454 |
| 2017/0213092 A1* | 7/2017 | Sugama ................. | H04N 7/181 |

FOREIGN PATENT DOCUMENTS

| | | |
|---|---|---|
| JP | 2008-215991 A | 9/2008 |
| JP | 2013-104861 A | 5/2013 |

OTHER PUBLICATIONS

Extended European Search Report for related EP App No. 15911412.3 dated Aug. 26, 2019, 8 pgs.

International Search Report for related International Application No. PCT/JP2015/086341, dated Mar. 1, 2016; English translation provided; 2 pages.

* cited by examiner (SEQUENTIAL CALCULATION OF AVERAGE PULSE WIDTH)

$X, Y, Z$ : VEHICLE COORDINATE SYSTEM
$O$ : ORIGIN OF VEHICLE COORDINATE SYSTEM
$P$ : GROUND OBJECT POSITION IN VEHICLE COORDINATE SYSTEM
$P'$ : ORTHOGRAPHIC PROJECTION FROM POINT P TO XY PLANE

X, Y, Z : VEHICLE COORDINATE SYSTEM
O : ORIGIN OF VEHICLE COORDINATE SYSTEM
P : GROUND OBJECT POSITION IN VEHICLE COORDINATE SYSTEM
P' : ORTHOGRAPHIC PROJECTION FROM POINT P TO XY PLANE

FIG. 12A

| NUMBER OF PULSES PER REVOLUTION | 100km/h | 80km/h | 60km/h | 50km/h | 40km/h | 30km/h | 10km/h |
|---|---|---|---|---|---|---|---|
| 2 PULSES | 35 PULSES | 28 PULSES | 21 PULSES | 17 PULSES | 14 PULSES | 7 PULSES | 3 PULSES |
| 4 PULSES | 70 PULSES | 56 PULSES | 42 PULSES | 35 PULSES | 28 PULSES | 14 PULSES | 6 PULSES |

(NUMBER OF PULSES PER ONE SECOND)

FIG. 12B

| NUMBER OF PULSES PER REVOLUTION | 100km/h | 80km/h | 60km/h | 50km/h | 40km/h | 30km/h | 10km/h |
|---|---|---|---|---|---|---|---|
| 2 PULSES | 28.3 ms | 35.3 ms | 47.1 ms | 56.5 ms | 70.7 ms | 94.2 ms | 282.6 ms |
| 4 PULSES | 14.1 ms | 17.7 ms | 23.5 ms | 28.3 ms | 35.3 ms | 47.1 ms | 141.3 ms |

(RELATION BETWEEN TRAVELING SPEED AND PULSE WIDTH)

DISTANCE ESTIMATION DEVICE, DISTANCE ESTIMATION METHOD AND PROGRAM

CROSS-REFERENCE TO RELATED APPLICATIONS

This application is a U.S. National Stage entry of PCT Application No: PCT/JP2015/086341, filed Dec. 25, 2015, the contents of which are incorporated herein by reference.

TECHNICAL FIELD

The present invention relates to a technique of estimating a moving distance of a movable body

BACKGROUND TECHNIQUE

Patent Reference-1 discloses a technique of correcting a vehicle speed sensor installed in a movable body by estimating a moving distance of the movable body in a predetermined time period, for example. In Patent Reference-1, the correction device detects a number of output pulses of the vehicle speed sensor after the image recognition means recognizes a ground object A until the image recognition means recognizes a ground object B, and acquires a distance D between the ground object A and the ground object B from map information. Then, the correction device corrects an arithmetic expression for calculating a traveling distance or a traveling speed of a vehicle from the number of output pulses, based on the relation between the number of output pulses and the distance D.

PRIOR ART REFERENCES

Patent References

Patent Reference-1: Japanese Patent Application Laid-Open under No. 2008-8783

SUMMARY OF THE INVENTION

Problem to be Solved by the Invention

However, according to the method of Patent Reference-1, since the image recognition means can recognize only one ground object at one time, the correction device can use only a ground object existing on a road on which the vehicle is traveling, such as a road sign painted on a road.

The above is an example of the problem to be solved by the present invention. It is an object of the present invention to estimate a traveling distance of a movable body by utilizing arbitrary ground objects.

Means for Solving the Problem

An invention described in claims is a distance estimation device comprising: an acquiring unit configured to acquire a first distance group and a second distance group including distances from a movable body at a first time and a second time to at least three ground objects and a third distance group including distances between the at least three ground objects; and a calculating unit configured to calculate a moving distance of the movable body from the first time to the second dime based on the distances from the movable body to the ground objects and the distances between the ground objects with respect to two ground objects specified based on the distances to the at least three ground objects or the distances between the at least three ground objects.

Another invention described in claims is a distance estimation method executed by a distance estimation device comprising: an acquiring process configured to acquire a first distance group and a second distance group including distances from a movable body at a first time and a second time to at least three ground objects and a third distance group including distances between the at least three ground objects; and a calculating process configured to calculate a moving distance of the movable body from the first time to the second time based on the distances from the movable body to the ground objects and the distances between the ground objects with respect to two ground objects specified based on the distances to the at least three ground objects or the distances between the at least three ground objects.

Still another invention described in claims is a program executed by a distance estimation device comprising a computer, the program causing the computer to function as: an acquiring unit configured to acquire a first distance group and a second distance group including distances from a movable body at a first time and a second time to at least three ground objects and a third distance group including distances between the at least three ground objects; and a calculating unit configured to calculate a moving distance of the movable body from the first time to the second time based on the distances from the movable body to the ground objects and the distances between the ground objects with respect to two ground objects specified based on the distances to the at least three ground objects or the distances between the at least three ground objects.

BRIEF DESCRIPTION OF THE DRAWINGS

FIGS. 12A and 12B illustrate a relation between a traveling speed and a number of pulses in a unit time, and a relation between the traveling speed and a pulse width.

DETAILED DESCRIPTION OF THE PREFERRED EMBODIMENTS

Figure 1:
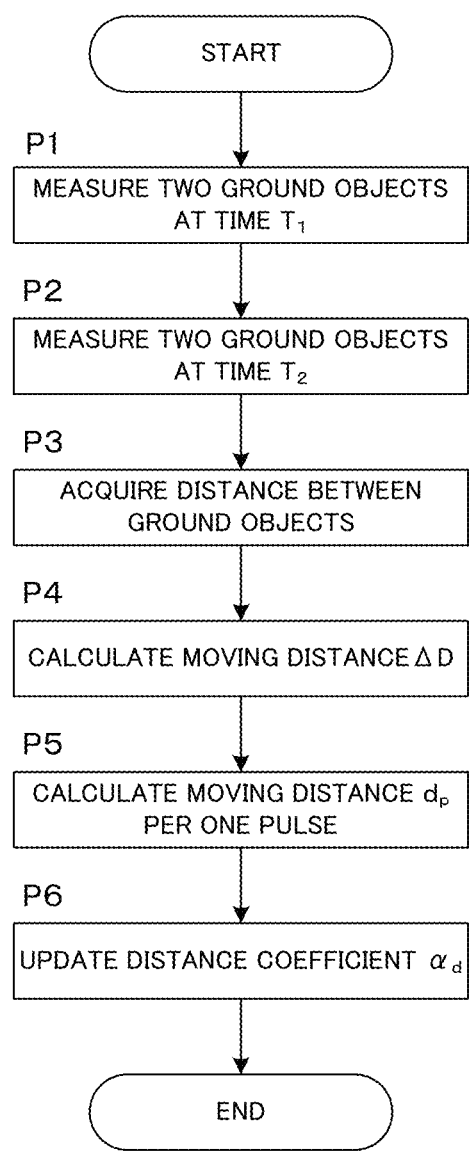
FIG. 1 is a flowchart illustrating distance coefficient updating processing according to embodiments.

According to one aspect of the present invention, there is provided a distance estimation device comprising: an acquiring unit configured to acquire a first distance group and a second distance group including distances from a movable body at a first time and a second time to at least three ground objects and a third distance group including distances between the at least three ground objects; and a calculating unit configured to calculate a moving distance of the movable body from the first time to the second dime based on the distances from the movable body to the ground objects and the distances between the ground objects with respect to two ground objects specified based on the distances to the at least three ground objects or the distances between the at least three ground objects.

The above distance estimation device acquires a first distance group and a second distance group including distances from a movable body at a first time and a second time to at least three ground objects and a third distance group including distances between the at least three ground objects. Then, the distance estimation device calculates a moving distance of the movable body from the first time to the second dime based on the distances from the movable body to the ground objects and the distances between the ground objects with respect to two ground objects specified based on the distances to the at least three ground objects or the distances between the at least three ground objects. Thus, the moving distance of the movable body can be calculated using arbitrary ground objects measurable from the movable body.

In one mode of the above distance estimation device, the calculating unit specifies, out of the at least three ground objects, two ground objects whose distance from the movable body is short as the two ground objects. In another mode, the calculating unit excludes two ground objects, for which the distance between the ground objects is shorter than a predetermined distance, from the two ground objects to be specified by the calculating unit.

In still another mode of the above distance estimation device, the calculating unit calculates the moving distance per one pulse of a vehicle speed pulse signal, based on the moving distance from the first time to the second time and an average pulse width of the vehicle speed pulse signal. Thus, the vehicle speed pulse signal can be calibrated based on the calculated moving distance.

In still another mode of the above distance estimation device, the calculating unit calculates the moving distance when an angular velocity in a yaw direction or a steering angle of the movable body is smaller than a predetermined threshold value. Thus, accuracy of calculating the moving distance may be improved.

In a preferred example of the above distance estimation device, the calculating unit acquires the distance between the two ground objects based on the distances to the two ground objects and angles formed by a traveling direction of the movable body and respective directions of the two ground objects. In another preferred example, the calculating unit acquires the distance between the two ground objects based on map information.

In still another mode of the above distance estimation device, the calculating unit changes a time interval from the first time to the second time in accordance with a traveling speed of the movable body. Thus, accuracy of calculating the moving distance may be improved. Preferably, the calculating unit makes the time interval shorter as the traveling speed of the movable body becomes higher.

According another aspect of the present invention, there is provided a distance estimation method executed by a distance estimation device comprising: an acquiring process configured to acquire a first distance group and a second distance group including distances from a movable body at a first time and a second time to at least three ground objects and a third distance group including distances between the at least three ground objects; and a calculating process configured to calculate a moving distance of the movable body from the first time to the second time based on the distances from the movable body to the ground objects and the distances between the ground objects with respect to two ground objects specified based on the distances to the at least three ground objects or the distances between the at least three ground objects. Thus, the moving distance of the movable body can be calculated using arbitrary ground objects measurable from the movable body.

According to still another aspect of the present invention, there is provided a program executed by a distance estimation device comprising a computer, the program causing the computer to function as: an acquiring unit configured to acquire a first distance group and a second distance group including distances from a movable body at a first time and a second time to at least three ground objects and a third distance group including distances between the at least three ground objects; and a calculating unit configured to calculate a moving distance of the movable body from the first time to the second time based on the distances from the movable body to the ground objects and the distances between the ground objects with respect to two ground objects specified based on the distances to the at least three ground objects or the distances between the at least three ground objects. Thus, the moving distance of the movable body can be calculated using arbitrary ground objects measurable from the movable body. The above program can be used in a manner stored on a storage medium.

Embodiments

Preferred embodiments of the present invention will be described below with reference to the attached drawings. The following description will be directed to the embodiments wherein a moving distance of a movable body acquired by a distance estimation method of the present invention is used in calibration of the vehicle speed pulses of the vehicle.

Background

A self-position estimation system installed in a present car navigation device detects a vehicle speed by a vehicle speed sensor and a traveling direction by an angular velocity sensor or a steering angle sensor, thereby to measure a moving state of the vehicle, and estimates a current position by integrating those information with information measured by a GPS or an external field sensor. Therefore, in order to improve accuracy of estimating the self-position, it is required to detect the vehicle speed with high accuracy.

The vehicle speed sensor outputs a vehicle speed pulse signal at the time interval proportional to the rotational speed of the output shaft of the transmission or the wheels, for example. Then, as indicated by the following equation (1), the vehicle speed v can be calculated by dividing the distance coefficient $\alpha_d$ by the pulse width $t_p$. This distance coefficient $\alpha_d$ is a moving distance per one pulse of the vehicle speed pulse signal.

$$v = \frac{\alpha_d}{t_p} \quad (1)$$

The moving distance per one pulse is different between vehicle types. Also, if the outside diameter of the tires change due to the variation of the air pressure of the tire or the tire exchange, the moving distance per one pulse changes. Further, the moving distance per one pulse changes dependently upon the traveling speed. Normally, due to the traveling resistance, there is a difference between the vehicle wheel speed obtained from the vehicle speed pulses and the actual vehicle body speed. Since the traveling resistance during the high speed traveling becomes larger than that during the low speed traveling, the speed difference between the vehicle wheel speed and the vehicle body speed during the high speed traveling becomes larger than that during the low speed traveling. Therefore, the moving distance per one pulse during the high speed traveling is different from that during the low speed traveling. For this reason, in order to acquire the vehicle speed with high accuracy, it is necessary to appropriately calibrate and update the distance coefficient.

Conventionally, when the distance coefficient is calibrated, information acquired from the GPS is used as a reference. For example, the moving distance $d_p$ per one pulse is calculated by the following equation (2) using the vehicle moving distance $\Delta D$ calculated from the GPS position obtained from the GPS and the number n of the vehicle speed pulses, and the correction is constantly made by applying averaging processing.

$$d_p = \frac{\Delta D}{n} \quad (2)$$

However, according to the condition, the GPS information itself, serving as the reference, may include large error, and when the calibration calculation is made by using the GPS information including large error as the reference, the distance coefficient may deviate from a true value. In order to obtain the GPS information used as the reference more accurately, the condition should be made stricter. However, as the condition is made stricter, there occurs such a conflicting problem that the reference information can be obtained less frequently and the progress of the calibration becomes slow.

Distance Coefficient Updating Processing

In the above view, a distance coefficient updating device (hereinafter simply referred to as "updating device") does not use the GPS information as the reference, and calculates the moving distance of the vehicle based on the measurement of the ground objects by the external field sensor and uses it as the reference for calibrating the vehicle speed pulse signal. As the external field sensor, a camera, a LiDAR (Light Detection And Ranging) or a millimeter wave radar may be used.

FIG. 1 is a flowchart illustrating distance coefficient updating processing according to the embodiments. First, in the process P1, the updating device measures two ground objects by using the external field sensor at a time $T_1$. Next, in the process P2, the updating device measures the same two ground objects as those measured at the time $T_1$, at a time $T_2$ $\Delta T$ seconds elapsed from the time $T_1$. Next, in the process P3, the updating device acquires a relative distance between those two ground objects.

Next, in the process P4, the updating device calculates the moving distance $\Delta D$ of the vehicle from the time $T_1$ to the time $T_2$ by using the distances from the vehicle center position to each of the ground objects and the relative distance between the two ground objects acquired at the time $T_1$ and the time $T_2$.

Next, in the process P5, the updating device calculates the moving distance $d_p$ per one pulse by using the average pulse width $t_p$ of the vehicle speed pulse signal between the time $T_1$ and the time $T_2$, an elapsed time $\Delta T$ from the time $T_1$ to the time $T_2$ and the moving distance $\Delta D$ of the vehicle from the time $T_1$ to the time $T_2$ acquired in the process P4. Then, in the process P6, the updating device updates the distance coefficient $\alpha_d$ by using the moving distance $d_p$ per one pulse acquired in the processes P5 and P6.

Next, each process in the above distance coefficient updating processing will be described in detail.

(1) Acquiring Distance Between Ground Objects (Processes P1 to P3)

Figure 2:
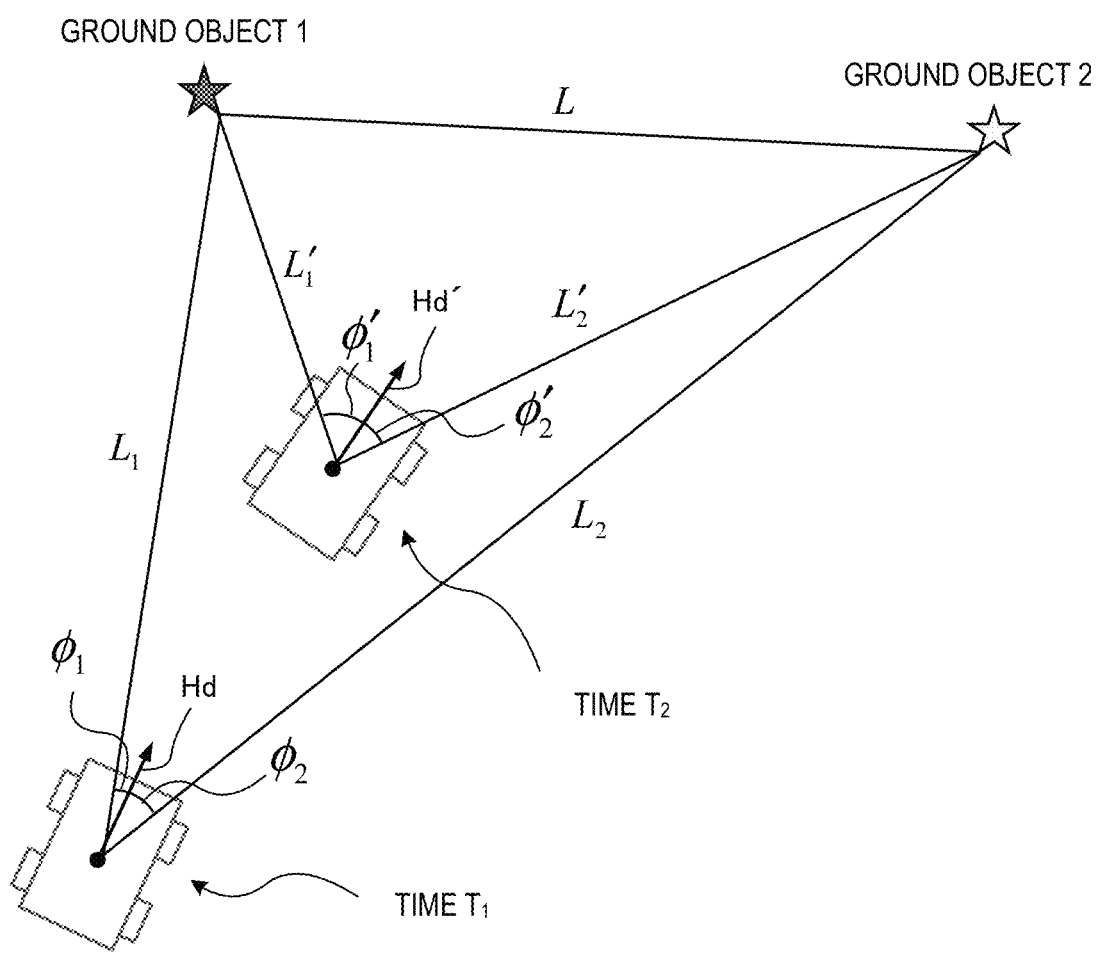
FIG. 2 illustrates a relation between two ground objects and a moving vehicle.

FIG. 2 illustrates an example of a positional relation between two ground objects and a movable body traveling. It is assumed that the vehicle moved from the time $T_1$ to the time $T_2$ as shown in FIG. 2. First, the updating device detects the ground object 1 and the ground object 2 at the time $T_1$, and acquires the distance $L_1$ from the vehicle to the ground object 1 and the angle $\phi_1$ formed by the traveling direction Hd of the vehicle and the direction of the ground object 1 as well as the distance $L_2$ from the vehicle to the ground object 2 and the angle $\phi_2$ formed by the traveling direction Hd of the vehicle and the direction of the ground object 2 (Process P1). At this time, the relative distance L between the ground object 1 and the ground object 2 can be calculated as follows by using $L_1$, $L_2$, $\phi_1$, $\phi_2$ (Process P3).

$$L^2 = L_1^2 + L_2^2 - 2L_1L_2\cos(\phi_1+\phi_2) \Leftrightarrow L = \sqrt{L_1^2+L_2^2-2L_1L_2\cos(\phi_1+\phi_2)} \quad (3)$$

Next, the updating device detects the ground object 1 and the ground object 2 at the time $T_2$ similarly to the time $T_1$, and acquires the distance $L'_1$ from the vehicle to the ground object 1 and the angle $\phi'_1$ formed by the traveling direction Hd' of the vehicle and the direction of the ground object 1 as well as the distance $L'_2$ from the vehicle to the ground object 2 and the angle $\phi'_2$ formed by the traveling direction Hd' of the vehicle and the direction of the ground object 2 (Process P2). At this time, similarly to the time $T_1$, the relative distance between the ground objects can be calculated by using $L'_1$, $L'_2$, $\phi'_1$, $\phi'_2$. The relative distance L' between the ground objects at the time $T_2$ is calculated by the following equation (Process P3).

$$L' = \sqrt{L'^2_1 + L'^2_2 - 2L'_1L'_2\cos(\phi'_1+\phi'_2)} \quad (4)$$

When the moving distance $\Delta D$ of the vehicle is calculated in the process P4 described later, the updating device uses either one of the relative distance L and L' between the ground objects. Alternatively, the updating device may calculate an average value $L_{ave}$ of the relative distances L and L' by the following equation and use it.

$$L_{ave} = \frac{L+L'}{2} \quad (5)$$

In the following description, the relative distance between the ground objects will be expressed as "L".

In the above example, in the process P3, the relative distance L between the ground objects (hereinafter referred to as "inter-ground-object distance L") is acquired by an arithmetic operation based on the measurement results of the ground objects by the external field sensor. However, if high precision map data is available, the inter-ground-object distance L may be acquired from the high precision map data. In a case where the inter-ground-object distance L is calculated from the measurement results of the ground objects by the external field sensor, the inter-ground-object distance L may vary dependently upon the measurement accuracy of the ground objects. Namely, if the measurement accuracy is low, the accuracy of the calculated inter-ground-object distance L becomes low and the accuracy of the moving distance ΔD of the vehicle calculated thereafter also becomes low. In this respect, if the high precision map data is used, the inter-ground-object distance L may be acquired with high accuracy, and hence the accuracy of the moving distance ΔD of the vehicle maybe improved.

(2) Calculating Moving Distance ΔD (Process P4)

Figure 3:
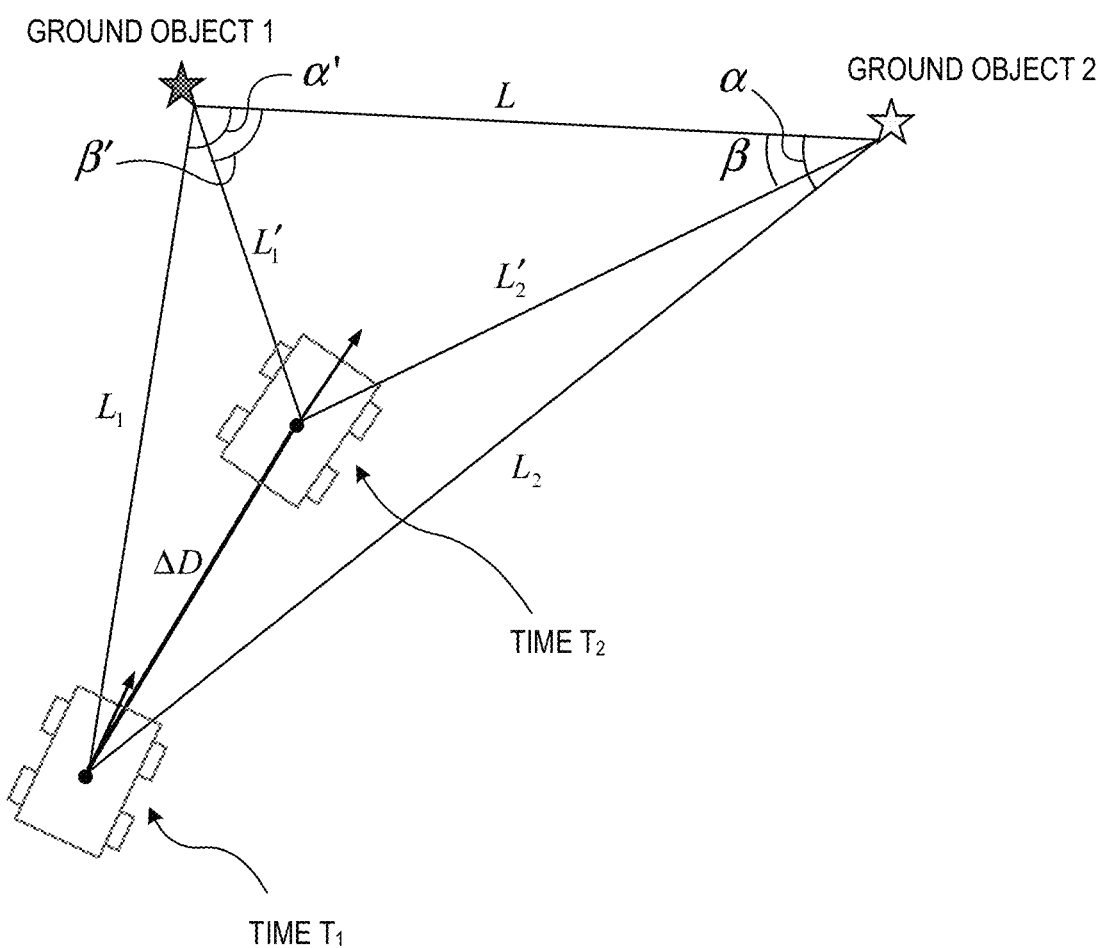
FIG. 3 illustrates a method of calculating a moving distance of the vehicle.

Next, the updating device calculates the moving distance ΔD of the vehicle from the time $T_1$ to the time $T_2$ by using the distances $L_1$, $L_2$ acquired at the time $T_1$, the distances $L'_1$, $L'_2$ acquired at the time $T_2$ and the inter-ground-object distance L. FIG. 3 illustrates a calculation method of the moving distance ΔD. In FIG. 3, the angle α is calculated by the cosine theorem as follows.

$$L_1^2 = L^2 + L_2^2 - 2LL_2 \cos\alpha \qquad (6)$$

$$\cos\alpha = \frac{L^2 + L_2^2 - L_1^2}{2LL_2}$$

$$\alpha = \arccos\left(\frac{L^2 + L_2^2 - L_1^2}{2LL_2}\right)$$

Similarly, the angle β is calculated by the cosine theorem as follows.

$$L_1'^2 = L^2 + L_2'^2 - 2LL_2'\cos\beta \qquad (7)$$

$$\cos\beta = \frac{L^2 + L_2'^2 - L_1'^2}{2LL_2'}$$

$$\beta = \arccos\left(\frac{L^2 + L_2'^2 - L_1'^2}{2LL_2'}\right)$$

Therefore, the moving distance ΔD is calculated by the cosine theorem as follows.

$$\Delta D^2 = L_2^2 + L_2'^2 - 2L_2 L_2' \cos(\alpha - \beta) \qquad (8)$$

$$\Delta D = \sqrt{L_2^2 + L_2'^2 - 2L_2 L_2' \cos(\alpha - \beta)}$$

While the moving distance ΔD is calculated by using the angles α, β on the ground object 2 side in FIG. 3, the moving distance ΔD may be calculated by using the angles α', β' on the ground object 1 side instead. Alternatively, an average value of the moving distances ΔD calculated by the above methods may be calculated.

(3) Calculating Moving Distance $d_p$ Per One Pulse (Process P5)

Next, the updating device calculates the moving distance $d_p$ per one pulse as follows by using the moving distance ΔD of the vehicle in the time period ΔT from the time $T_1$ to the time $T_2$ and the average pulse width $t_p$ of the vehicle speed pulse signal.

$$d_p = \frac{\Delta D}{\Delta T} \cdot t_p \qquad (9)$$

Figure 4:
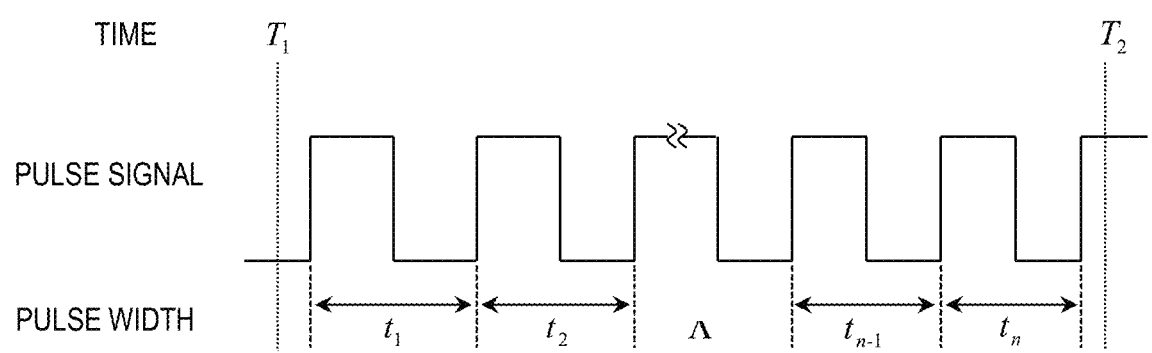
FIG. 4 is a diagram for explaining an average pulse width.

FIG. 4 is a diagram explaining the average pulse width $t_p$. The average pulse width $t_p$ may be calculated by buffering the pulse widths measured from the time $T_1$ and to the time $T_2$ and averaging them by the following equation (10).

$$t_p = \frac{1}{n}\sum_{k=1}^{n} t_k \qquad (10)$$

Instead, the average pulse width $t_p$ may be calculated by a sequential calculation using the equation (11). If the average pulse width $t_p$ is calculated by the sequential calculation, it is not necessary to buffer the measured pulse widths and hence the usage amount of the memory in the device may be reduced.

$$t_p = t_p + \frac{t_k - t_p}{k} \qquad (11)$$

Figure 5:
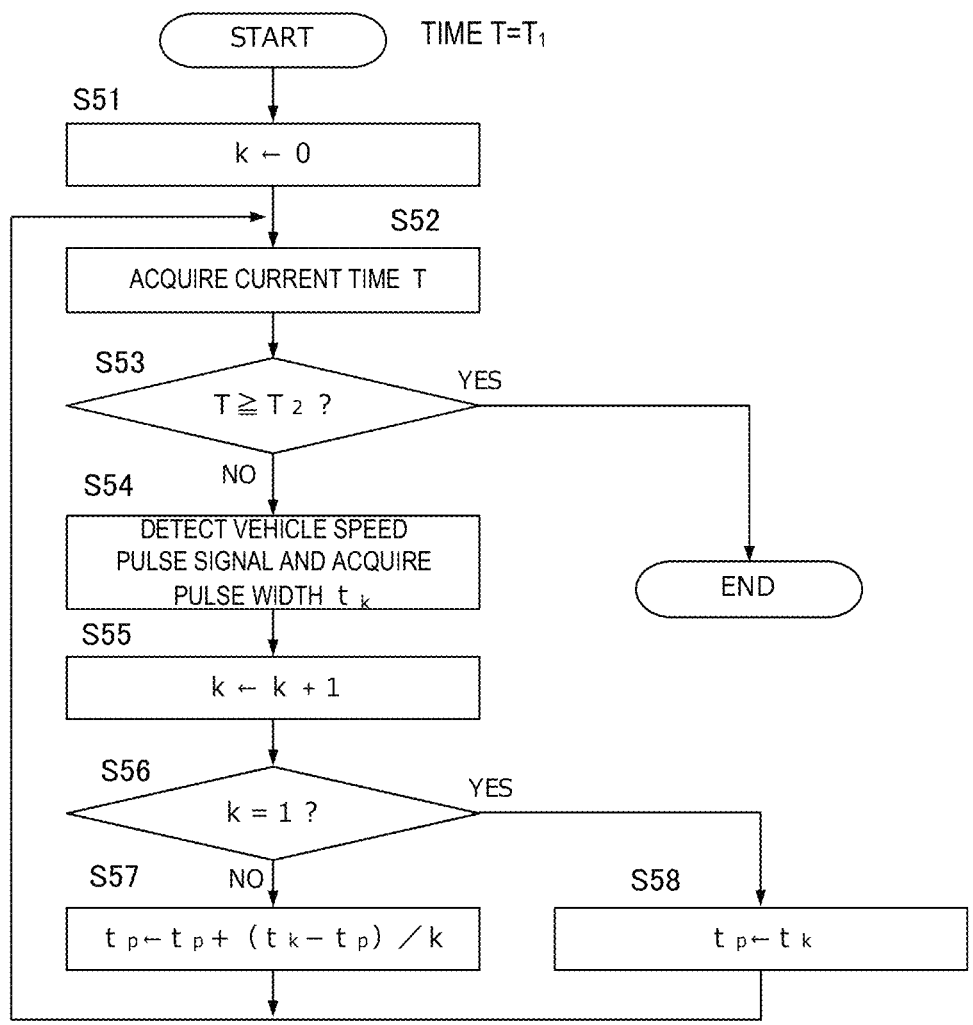
FIG. 5 is a flowchart of processing for calculating the average pulse width by sequential calculation.

FIG. 5 is a flowchart of the processing for calculating the average pulse width by the sequential calculation. First, at the time $T=T_1$, the updating device resets the coefficient k indicating the number of detected pulses to "0" (step S51), and acquire the current time T (step S52). Next, the updating device determines whether or not the current time T becomes the time $T_2$ (step S53).

If the current time T does not become the time $T_2$ (step S53: NO), the updating device detects the vehicle speed pulse signal and acquires the pulse width $t_k$ (step S54). Next, the updating device increments the coefficient k by "1" (step S55), and determines whether or not the coefficient k is equal to "1" (step S56).

If the coefficient k is equal to "1" (step S56: YES), the updating device substitutes the pulse width $t_k$ for the average pulse width $t_p$ (step S58), and returns to step S52. On the contrary, if the coefficient k is not equal to "1" (step S56: NO), the updating device adds the value $(t_k-t_p)/k$ calculated by subtracting the difference between the average pulse width $t_p$ at that time and the pulse width $t_k$ at present by the coefficient k, i.e., the variation of the average pulse width $t_p$ due to the pulse width $t_k$ at present, to the average pulse width $t_p$ at that time to update the average pulse width $t_p$, and returns to step S52. Then, if the current time T becomes the time $T_2$ (step S53: YES), the processing ends.

(4) Updating Distance Coefficient $\alpha_d$ (Process P6)

Next, the updating device updates the distance coefficient $\alpha_d$ by using the moving distance $d_p$ acquired in the process P5. Specifically, the updating device sets the moving distance $d_p$ to a new distance coefficient $\alpha_d$. The distance coefficient $\alpha_d$ thus updated is used for the calculation of the vehicle speed v by the equation (1).

Figure 6A:
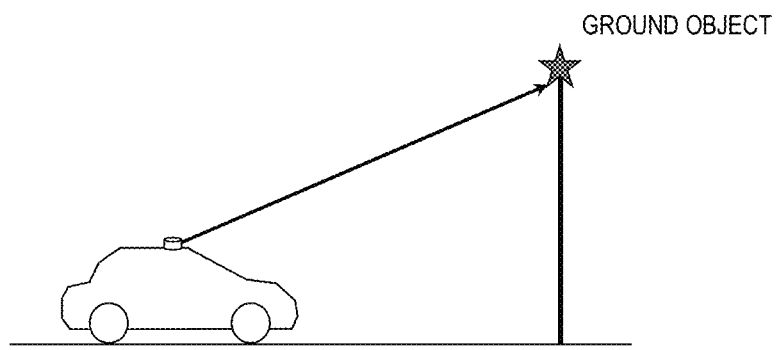
FIGS. 6A to 6C illustrate a method of projecting a three-dimensional position of the ground object to the horizontal plane of the vehicle.

(5) Method of Projecting Three-Dimensional Position of Ground Object to Horizontal Plane of Vehicle In the above description, the distances L1, L2, L'1, L'2 are calculated as the distance in the three-dimensional space, i.e., as the direct distance from the external field sensor loaded on the vehicle to the ground object. However, when the ground object exists at a high position from the horizontal plane (road plane) of the vehicle as shown in FIG. 6A, the accuracy can be improved by calculating the distance from the vehicle to the ground object in case of projecting the position of the ground object to the horizontal plane of the vehicle (hereinafter referred to as "horizontal distance"). This method will be described below.

Figure 6B:
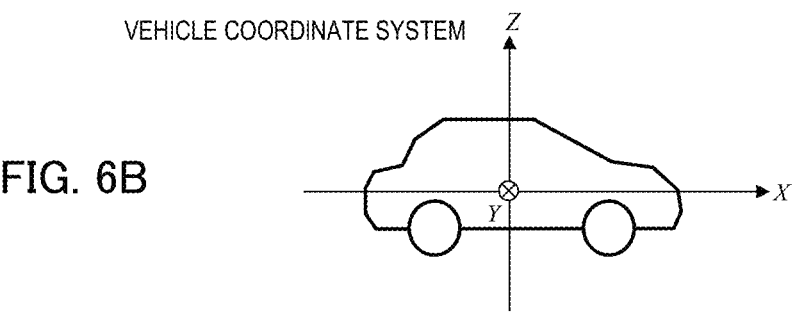
Figure 6C:
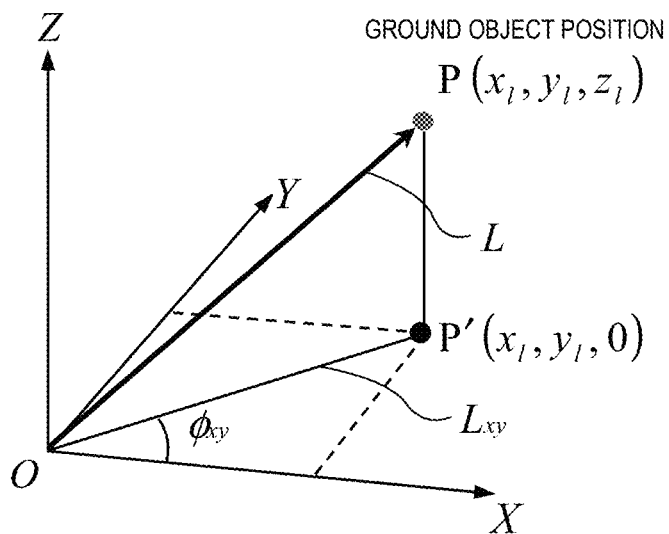

Now, it is assumed that a vehicle coordinate system (XYZ coordinate system) is defined as shown in FIG. 6B. Here, the X-axis indicates the traveling direction of the vehicle, the Y-axis indicates a direction perpendicular to the traveling direction of the vehicle within the horizontal plane of the vehicle, and the Z-axis indicates the height direction of the vehicle.

(i) In a Case Where Three-Dimensional Position of Ground Object can be Acquired

In a case where the three-dimensional coordinates of the ground object can be acquired by using the external field sensor such as an onboard camera capable of measuring the three-dimensional position of the ground object, or in a case where the three-dimensional coordinate data is included in the map data, it is now assumed that the three-dimensional coordinate P of the ground object in the vehicle coordinate system can be acquired. It is noted that the horizontal plane of the vehicle (XY plane of the vehicle coordinate system) and the road plane are parallel with each other.

In this case, supposing that the orthographic projection from the point P to the XY plane (the foot of the perpendicular line drawn from the point P to the XY plane) is the point P', the length $L_{xy}$ of the segment OP' and the angle $\phi_{xy}$ formed by the segment OP' and the X-axis can be calculated as follows.

$$L_{xy} = \sqrt{x_l^2 + y_l^2} \qquad (12\text{-}1)$$

$$\phi_{xy} = \arctan\left(\frac{y_l}{x_l}\right) \qquad (12\text{-}2)$$

Therefore, in the processing of the processes P1 to P4, not the distance L to the ground object and the angle φ of the ground object in the three-dimensional space, the horizontal distance $L_{xy}$ and the angle $\phi_{xy}$ may be used. Specifically, in the process P1, the horizontal distances $L_{1xy}$, $L_{2xy}$ are calculated instead of the distances $L_1$, $L_2$, and the angles $\phi_{1xy}$, $\phi_{2xy}$ are calculated instead of the angles $\phi_1$, $\phi_2$. Similarly, in the process P2, the horizontal distances $L'_{1xy}$, $L'_{2xy}$ are calculated instead of the distances $L'_1$, $L'_2$, and the angles $\phi'_{1xy}$, $\phi'_{2xy}$ are calculated instead of the angles $\phi'_1$, $\phi'_2$. Then, the inter-ground-object distances L and L' are calculated based on them in the process P2, and the moving distance ΔD is calculated in the process P4.

(ii) In a Case Where Distance and Angle to Ground Object are Measured

Figure 7:
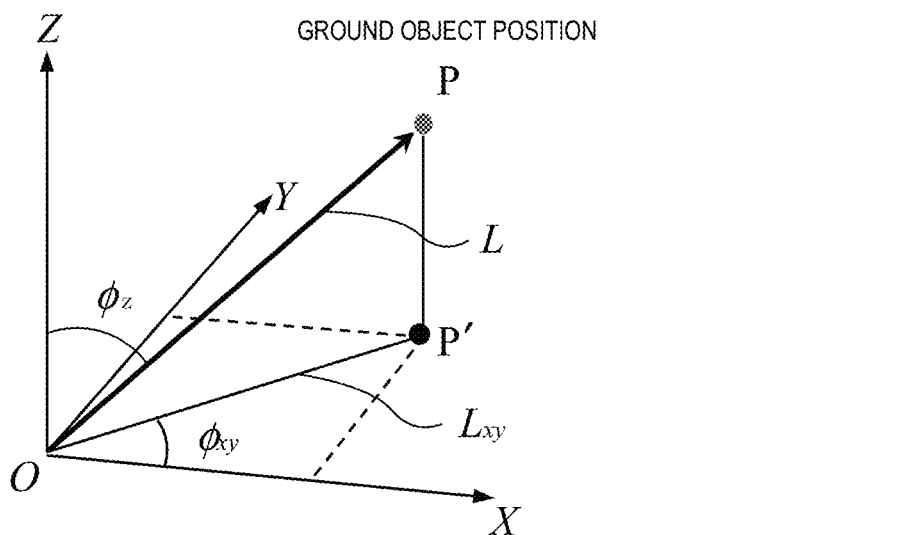
FIG. 7 illustrates another method of projecting a three-dimensional position of the ground object to the horizontal plane of the vehicle.

It is assumed that the distance L to the ground object and two deflection angles (the angle $\phi_{xy}$ formed by $L_{xy}$ obtained by projecting the segment of the distance L to the XY plane and the X-axis, and the angle $\phi_z$ formed by the segment of the distance L and the Z-axis) in the vehicle coordinate system can be acquired by using the external field sensor capable of measuring the distance to and angle of the ground object as shown in FIG. 7. Here, it is assumed that the horizontal plane of the vehicle (the XY plane in the vehicle coordinate system) and the road plane are parallel with each other.

In this case, supposing that the orthographic projection from the point P to the XY plane (the foot of the perpendicular line drawn from the point P to the XY plane) is the point P', the length $L_{xy}$ of the segment OP' can be calculated as follows.

$$L_{xy} = L \cos \phi_{xyz} \qquad (13)$$

Therefore, similarly to the above case, in the processing in the processes P1 to P4, the horizontal distance $L_{xy}$ and the angle $\phi_{xy}$ may be used instead of the distance L and the angle φ in the three-dimensional space.

1st Embodiment

Figure 8:
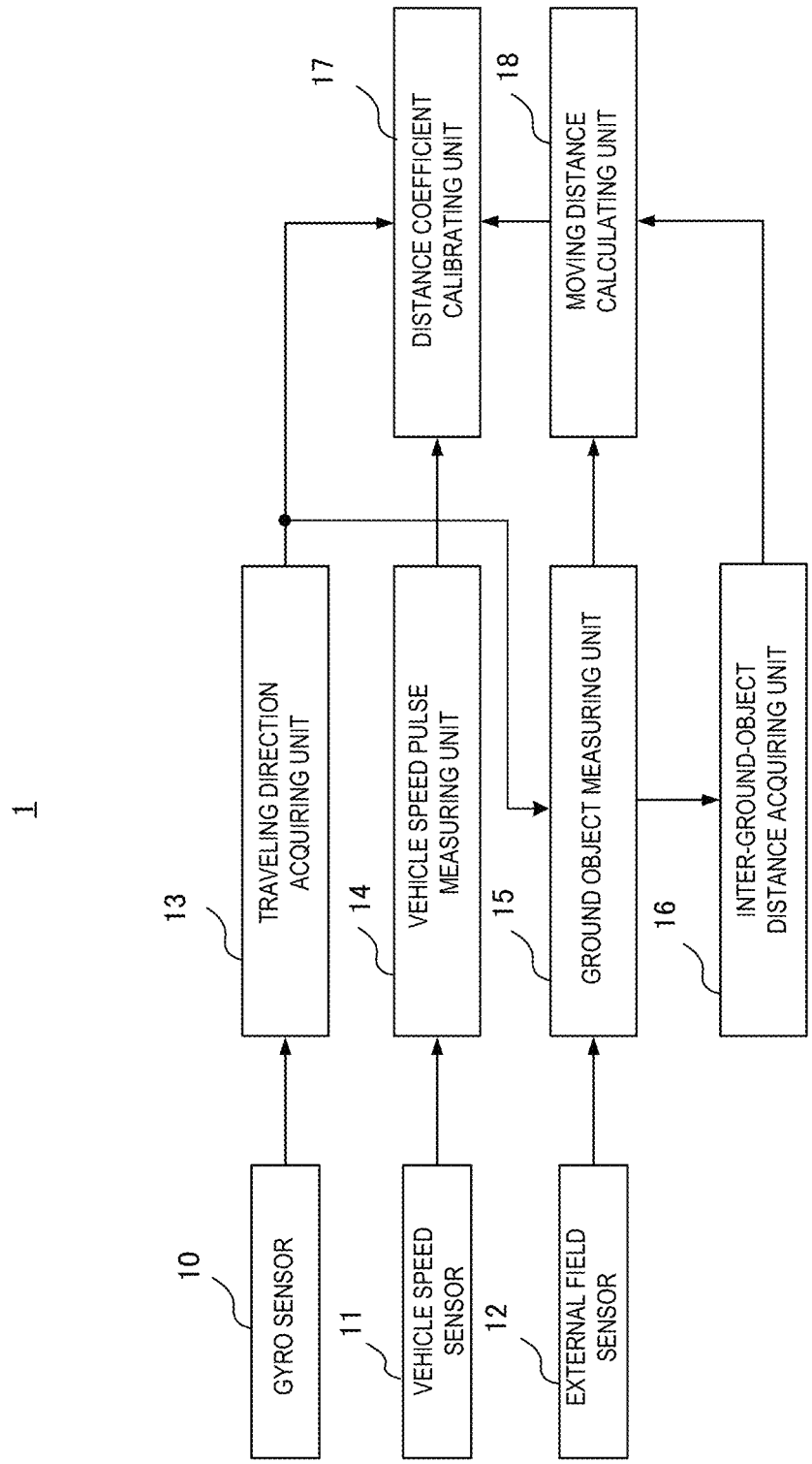
FIG. 8 is a block diagram illustrating a configuration of a distance coefficient updating device according to a first embodiment.

Next, the first embodiment of the above updating device will be described. FIG. 8 is a block diagram illustrating a configuration of the updating device 1 according to the first embodiment. In the first embodiment, the updating device 1 calculates the inter-ground-object distance L by arithmetic operation based on the measurement results of two ground objects by the external field sensor.

As illustrated, the updating device 1 includes a gyro sensor 10, a vehicle speed sensor 11, an external field sensor 12, a traveling direction acquiring unit 13, a vehicle speed pulse measuring unit 14, a ground object measuring unit 15, an inter-ground-object distance acquiring unit 16, a distance coefficient calibrating unit 17 and a moving distance calculating unit 18. The traveling direction acquiring unit 13, the vehicle speed pulse measuring unit 14, the ground object measuring unit 15, the inter-ground-object distance acquiring unit 16, the distance coefficient calibrating unit 17 and the moving distance calculating unit 18 may be realized by a computer such as a CPU which executes a program prepared in advance.

The traveling direction acquiring unit 13 acquires the traveling direction Hd of the vehicle based on the output from the gyro sensor 10, and supplies it to the ground object measuring unit 15 and the distance coefficient calibrating unit 17. The vehicle speed pulse measuring unit 14 measures the vehicle speed pulses outputted from the vehicle speed sensor 11, calculates the average pulse width $t_p$ of the vehicle speed pulse signal and supplies it to the distance coefficient calibrating unit 17.

The external field sensor 12 may be a camera, a LiDAR and a millimeter wave radar, for example, and the ground object measuring unit 15 measures the distance to the ground object based on the output from the external field sensor 12. Specifically, the ground object measuring unit 15 measures the distances $L_1$, $L_2$ from the vehicle to the two ground objects at the time $T_1$, calculates the angles $\phi_1$, $\phi_2$ formed by the traveling direction Hd supplied from the traveling direction acquiring unit 13 and the directions of the two ground objects, and supplies them to the inter-ground-object distance acquiring unit 16 and the moving distance calculating unit 18. Also, the ground object measuring unit 15 measures the distances $L'_1$, $L'_2$ from the vehicle to the two ground objects at the time $T_2$, calculates the angles $\phi'_1$, $\phi'_2$ formed by the traveling direction Hd' supplied from the traveling direction acquiring unit 13 and the directions of the two ground objects, and supplies them to the inter-ground-object distance acquiring unit 16 and the moving distance calculating unit 18.

The inter-ground-object distance acquiring unit 16 calculates the inter-ground-object distance L by the above equation (3) based on the distances $L_1$, $L_2$ and the angles $\phi_1$, $\phi_2$ for the two ground objects measured by the ground object measuring unit 15, and supplies them to the moving distance calculating unit 18.

The moving distance calculating unit 18 calculates the moving distance ΔD of the vehicle by the above equations (6) to (8) based on the distances $L_1$, $L_2$, $L'_1$, $L'_2$ supplied from the ground object measuring unit 15 and the inter-ground-object distance L calculated by the inter-ground-object distance acquiring unit 16, and supplies it to the distance coefficient calibrating unit 17.

The distance coefficient calibrating unit 17 calculates the moving distance $d_p$ per one pulse (i.e., the distance coefficient $\alpha_d$) based on the average pulse width $t_p$ supplied from the vehicle speed pulse measuring unit 14 and the moving distance ΔD supplied from the moving distance calculating unit 18. From the moving distance per one pulse, the vehicle speed may be calculated.

Figure 9:
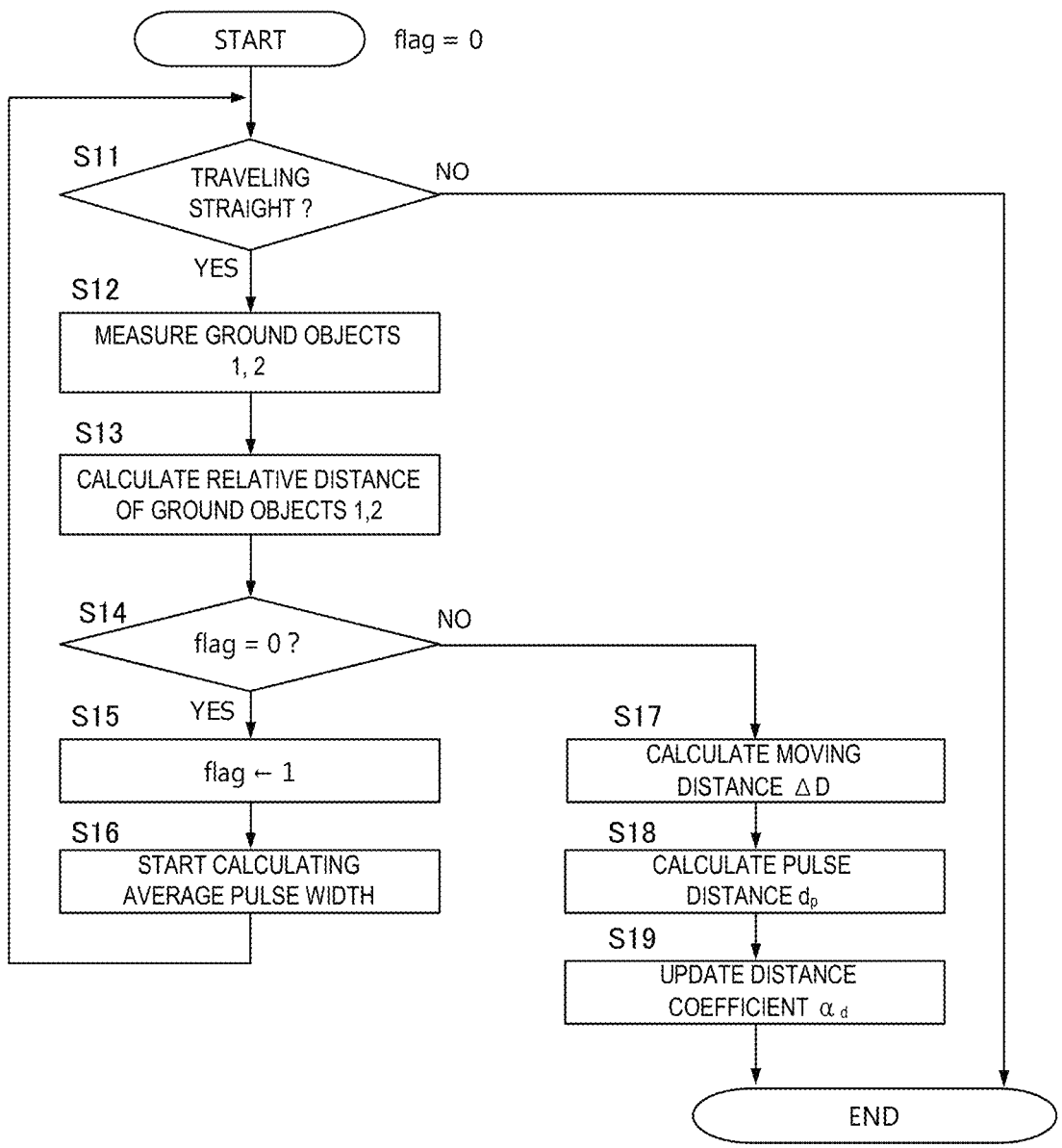
FIG. 9 is a flowchart of distance coefficient updating processing according to the first embodiment.

Next, the distance coefficient updating processing according to the first embodiment will be described. FIG. 9 is a flowchart of the distance coefficient updating processing according to the first embodiment.

First, the updating device 1 determines whether or not the vehicle is traveling straight based on the traveling direction of the vehicle outputted by the traveling direction acquiring unit 13 (step S11). This is because, if the vehicle is not traveling straight, the accuracy of the moving distance ΔD outputted by the moving distance calculating unit 18 is deteriorated. Specifically, in a case where the gyro sensor 10 can detect the angular velocity ω in the yaw direction of the vehicle, the updating device 1 may determine that the vehicle is traveling straight when $|\omega|<\Delta\omega$ (Δω: predetermined threshold value) is established. Also, in a case where the steering angle δ of the vehicle can be detected, the updating device 1 may determine that the vehicle is traveling straight when $|\delta|<\Delta\delta$ (Δδ: predetermined threshold value) is established.

When the vehicle is not traveling straight (step S11: NO), the processing ends. On the other hand, when the vehicle is traveling straight (step S11: YES), the updating device 1 measures two ground objects 1 and 2 (step S12), and calculates the relative distance L between them (step S13).

Next, the updating device 1 determines whether or not "flag=0" is established (step S14). It is noted that "flag" is reset at the start of the processing. When "flag=0" is established (step S14: YES), the updating device 1 sets "1" to "flag" (step S15), starts the calculation of the average pulse width $t_p$ (step S16), and returns to step S11.

On the other hand, when "flag=0" is not established (step S14: NO), the updating device 1 calculates the moving distance ΔD as described above (step S17), calculates the moving distance $d_p$ per one pulse by using the moving distance ΔD (step S18), and updates the distance coefficient $\alpha_d$ (step S19). Then, the processing ends.

2nd Embodiment

Figure 10:
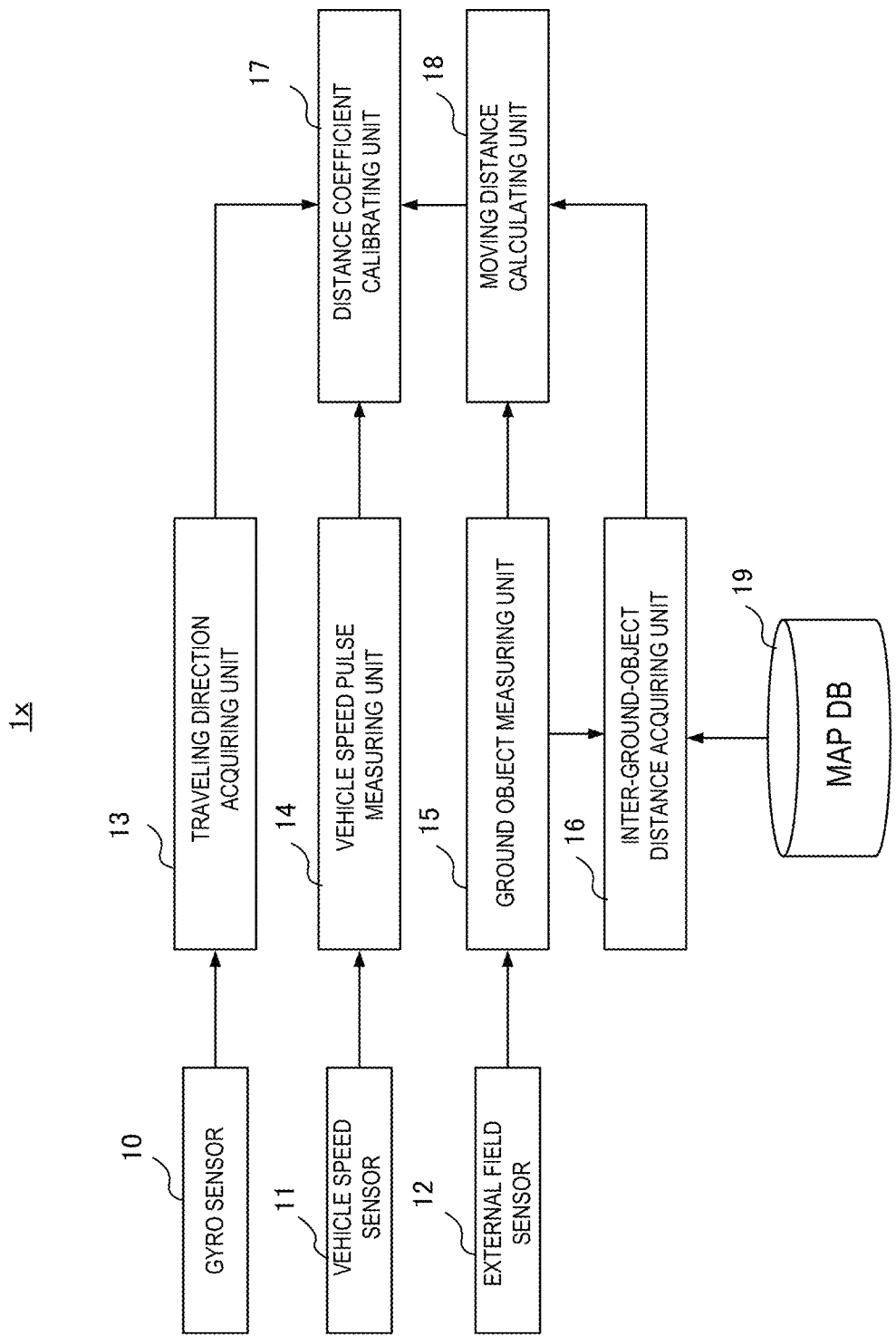
FIG. 10 is a block diagram illustrating a configuration of a distance coefficient updating device according to a second embodiment.

Next, the second embodiment of the above updating device will be described. FIG. 10 is a block diagram illustrating a configuration of an updating device 1x according to the second embodiment. While the updating device 1x is different from the updating device 1 in that the updating device 1x includes a map database (DB) 19 storing high precision map data, other constitutive elements are the same as the updating device 1 of the first embodiment, and therefore the description thereof will be omitted.

In the updating device 1x of the second embodiment, the inter-ground-object distance acquiring unit 16 acquires the inter-ground-object distance L between the two ground objects by using the high precision map data stored in the map DB 19.

Figure 11:
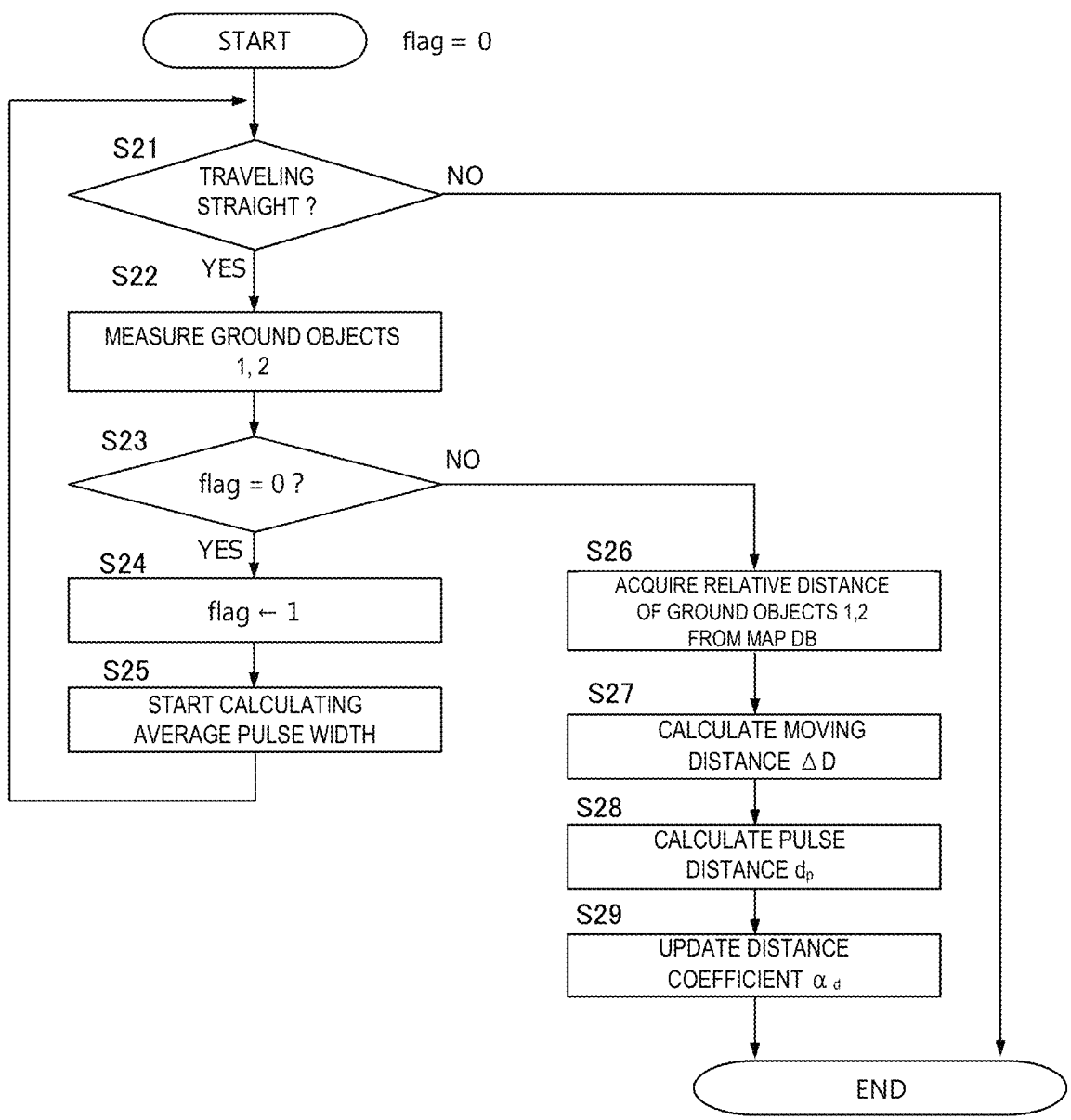
FIG. 11 is a flowchart of distance coefficient updating processing according to the second embodiment.

FIG. 11 is a flowchart illustrating the distance coefficient updating processing according to the second embodiment. In comparison with the distance coefficient updating processing shown in FIG. 9, the distance coefficient updating processing according to the second embodiment is different in that the inter-ground-object distance L is acquired from the map DB in step S26 instead of step S13 in the first embodiment, but other steps are basically the same as the distance coefficient updating processing according to the first embodiment. Specifically, steps S21 to S22, S23 to S25, S27 to S29 are the same as steps S11 to S12, S14 to S16, S17 to S19 in the distance coefficient updating processing according to the first embodiment, respectively.

Cycle of Measuring Ground Object

The moving distance $d_p$ per one pulse calculated in the above distance coefficient updating processing is the average of the moving distances per one pulse in the time interval ΔT from the time $T_1$ to the time $T_2$. Therefore, if the variation of the pulse widths in the time interval ΔT is large, the accuracy of the calculated moving distance $d_p$ is deteriorated. Accordingly, it is desired that the number of pulses in the time interval ΔT is as small as possible.

The number of pulses in a unit time is different dependently upon the traveling speed of the vehicle. For example, as shown in FIG. 12A, the number of pulses in one second is considered. In a type of vehicle in which two pulses are outputted during one revolution of the tire, the number of pulses per one second is 3 pulses at 10 km/h, 17 pulses at 50 km/h and 35 pulses at 100 km/h, and is largely different dependently upon the traveling speed.

Therefore, by changing the time interval ΔT according to the traveling speed in consideration of the measurement cycle of the external field sensor and the type of vehicle, it becomes possible to suppress the deterioration of the accuracy of the moving distance $d_p$ due to the variation of the pulse width. FIG. 12B illustrates the relation between the traveling speed and the pulse width. For example, if the measurement cycle of the external field sensor is 50 ms (20 Hz) and the vehicle is of the type in which two pulses are outputted per one revolution of the tire, the time interval ΔT is set to 300 ms when the traveling speed is lower than 20 km/h, set to 200 ms when the traveling speed is higher than 20 km/h and lower than 30 km/h, set to 100 ms when the traveling speed is higher than 30 km/h and lower than 60 km/h and set to 50 ms when the traveling speed is higher than 60 km/h. Thus, the number of pulses measured in the time interval ΔT becomes one or two, and the moving distance $d_p$ can be calculated with high accuracy.

3rd Embodiment

In the above distance coefficient updating processing, two ground objects are measured. However, if three or more ground objects can be measured at the same time, the moving distance may be calculated by the following method.

(1) Method of Using Average Value

When three or more ground objects can be measured at the same time, it is possible to calculate the moving distance ΔD in plural combinations and use the average value of them to update the distance coefficient.

Figure 13:
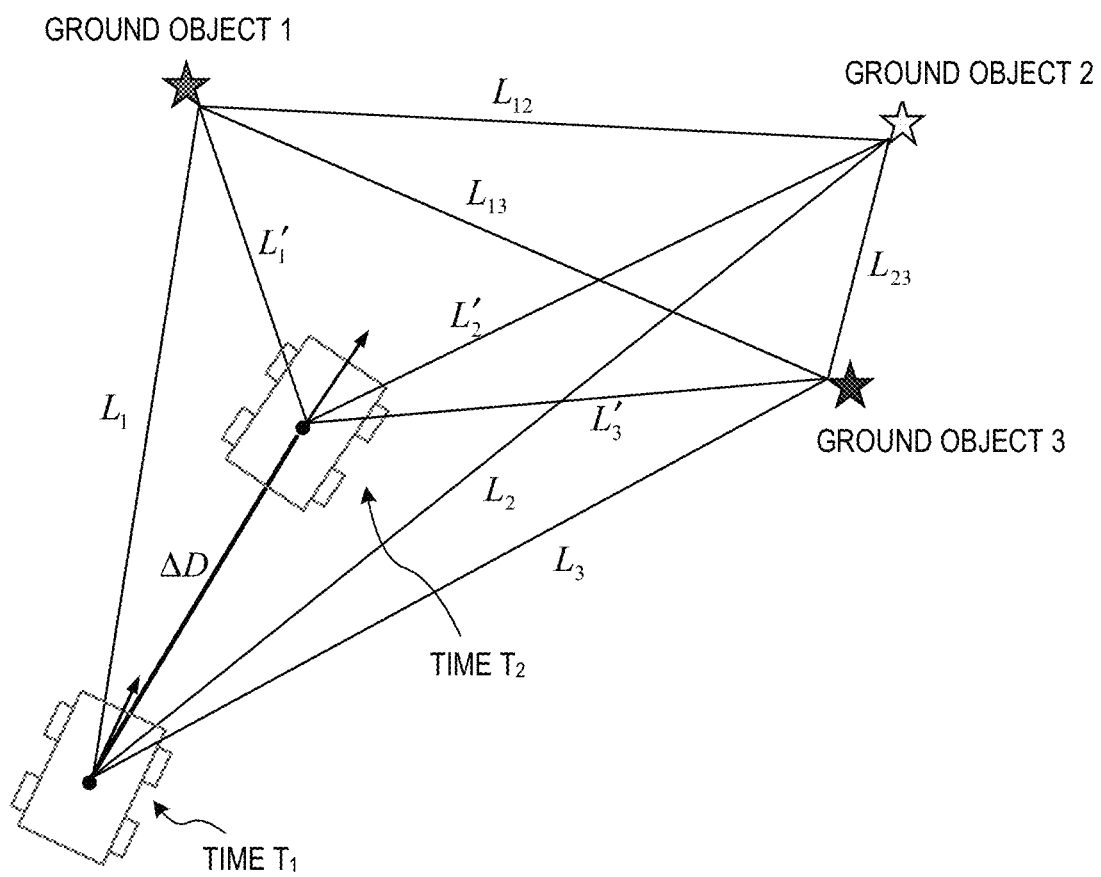
FIG. 13 illustrates a positional relation between three ground objects and a moving vehicle.

For example, if three ground objects can be measured, the combinations of the ground object 1 and the ground object 2, the ground object 2 and the ground object 3, the ground object 3 and the ground object 1 can be selected as shown in FIG. 13. For each combination, the moving distance from the time $T_1$ to the time $T_2$ is calculated by the method of the processes P1 to P3 described above. When the moving distance acquired from the combination of the ground object 1 and the ground object 2 is indicated as "$\Delta D_{12}$", the moving distance acquired from the combination of the ground object 2 and the ground object 3 is indicated as "$\Delta D_{23}$", the moving distance acquired from the combination of the ground object 3 and the ground object 1 is indicated as "$\Delta D_{31}$", the average value of them acquired by the following equation can be used as the moving distance ΔD.

$$\Delta D = \frac{\Delta D_{12} + \Delta D_{23} + \Delta D_{31}}{3} \quad (14)$$

Thus, the accuracy of the moving distance ΔD may be statistically improved, and the accuracy of the moving distance per one pulse may be improved.

(2) Method of Selecting Two Ground Objects in Consideration of the Distance to Ground Object When three or more ground objects can be measured at the same time, the moving distance may be calculated based on the combination of two ground objects having high reliability, thereby to acquire moving distance with high accuracy. Generally, the accuracy of the measurement by the external field sensor is deteriorated as the distance becomes long. Therefore, when three or more ground objects can be measured at the same time, two ground objects nearest and second nearest from the vehicle are selected, and the moving distance is acquired based on them by the method of the first embodiment or the second embodiment.

For example, when three ground objects 1 to 3 can be measured like the example of FIG. 13, the distances from the vehicle to those three ground objects has the relation: $L_1 < L_3 < L_2$. Therefore, the updating device may acquire the moving distance ΔD by using the nearest and the second nearest ground objects from the vehicle, i.e., the ground object 1 and the ground object 3.

(3) Method of Selecting Two Ground Objects in Consideration of Distances Between Ground Objects Normally, when the ground objects are too close to each other, the calculation accuracy is deteriorated. Therefore, when three or more ground objects can be measured at the same time, the combination of two ground objects closer than a predetermined threshold $L_{th}$ is excluded.

Figure 14:
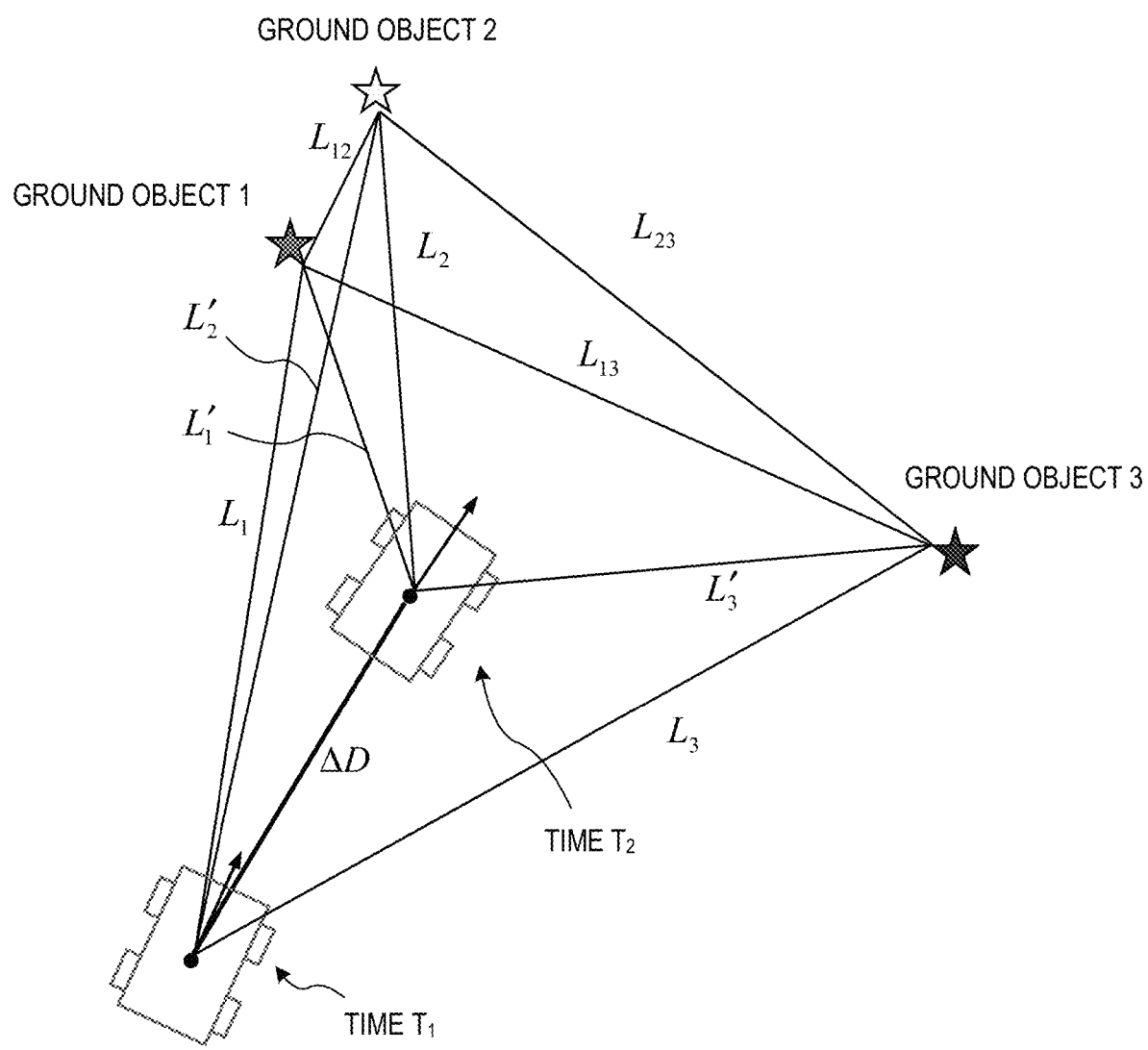
FIG. 14 illustrates another positional relation between three ground objects and a moving vehicle.

For example, when three ground objects 1 to 3 can be measured like the example of FIG. 14, the distances between the ground objects are compared with the threshold $L_{th}$. In the example of FIG. 14, it is assumed that: $L_{12} < L_{th}$, $L_{23} > L_{th}$, $L_{31} > L_{th}$. In this case, the combination for which the distance between the ground objects is shorter than the threshold value $L_{TH}$, i.e., the combination of the ground object 1 and the ground object 2 is excluded, and the moving distance ΔD may be acquired by using the combination of the ground object 2 and the ground object 3 and the combination of the ground object 1 and the ground object 3. Specifically, in consideration of the distance from the vehicle to the ground object by the above method (2), since the ground object 1 is closer to the vehicle than the ground object 2 ($L_1 < L_2$), the updating device may acquire the moving distance ΔD based on the combination of the ground object 1 and the ground object 3.

Instead, by using the above method (1), the moving distance ΔD may be determined as the average value of the moving distance $\Delta D_{12}$ acquired from the combination of the ground object 1 and the ground object 2 and the the moving distance $\Delta D_{31}$ acquired from the combination of the ground object 1 and the ground object 3. While a predetermined distance is determined as the threshold value $L_{th}$, an average value of the inter-ground-object distances between three or more measured ground objects may be used as the threshold value $L_{th}$.

MODIFIED EXAMPLES

1st Modified Example

The inter-ground-object distance L is calculated from the measurement results of two ground objects in the first embodiment, and the inter-ground-object distance L is acquired by using the map data in the second embodiment. However, the above two methods may be used in combination. For example, the inter-ground-object distance L may be acquired by using the high precision map data in the area where the high precision map data exists, and the inter-ground-object distance L may be calculated from the measurement results of the ground objects in the area where the high precision map data does not exist. Also, one of the inter-ground-object distances L having higher accuracy may be used.

2nd Modified Example

As shown by step S11 in FIG. 9 and step S21 in FIG. 11, the distance coefficient updating processing of the embodiments basically updates the distance coefficient while the vehicle is traveling straight. However, even if the vehicle appears to be traveling straight, actually the vehicle is not strictly traveling straight sometimes and may have small staggering. Therefore, the moving distance ΔD acquired in the process P3 is not the actual moving distance but an approximate value. Accordingly, if the time interval ΔT is too large, the difference between the actual moving distance and the moving distance calculated in the process P4 becomes large. In this view, it is desired to make the time interval ΔT from the time $T_1$ to the time $T_2$ as short as possible.

3rd Modified Example

If the external field sensor is mounted on a low position of the vehicle, occlusion by surrounding vehicles increases, and the frequency of detecting the ground objects suitable for updating the distance coefficient may decrease. Therefore, it is preferred that the external field sensor is mounted on a position to measure areas higher than the heights of the surrounding vehicles. Thus, the frequency of detecting the ground objects increases, the frequency of updating the distance coefficient also increases, and the accuracy of the distance coefficient can be improved.

INDUSTRIAL APPLICABILITY

This invention can be used for a device loaded on a movable body.

BRIEF DESCRIPTION OF REFERENCE NUMBERS

10 Gyro sensor
11 Vehicle speed sensor
12 External field sensor
13 Traveling direction acquiring unit
14 Vehicle pulse measuring unit
15 Ground object measuring unit
16 Inter-ground-object acquiring unit
17 Distance coefficient calibrating unit
18 Moving distance calculating unit
19 Map database

The invention claimed is:

1. A distance estimation device comprising:
   a device configured to detect at least three ground objects;
   an acquiring unit configured to acquire a first distance group and a second distance group including distances from a movable body at a first time and a second time to the at least three ground objects and a third distance group including distances between the at least three ground objects; and
   a calculating unit configured to calculate a moving distance of the movable body from the first time to the second time based on the distances from the movable body to the ground objects and the distances between the ground objects, wherein the moving distance of the movable body is calculated with respect to two ground objects that are specified based on the distances from the movable body to the at least three ground objects or the distances between the at least three ground objects.

2. The distance estimation device according to claim 1, wherein the calculating unit specifies, out of the at least three ground objects, two ground objects whose respective distances from the movable body are shorter than the distance from the moveable body to the other ground objects of the at least three ground objects.

3. The distance estimation device according to claim 1, wherein the calculating unit excludes two ground objects, for which the distance between the ground objects is shorter than a predetermined distance, from the two ground objects to be specified by the calculating unit.

4. The distance estimation device according to claim 1, wherein the calculating unit calculates the moving distance per one pulse of a vehicle speed pulse signal, based on the moving distance from the first time to the second time and an average pulse width of the vehicle speed pulse signal.

5. The distance estimation device according to claim 1, wherein the calculating unit calculates the moving distance when an angular velocity in a yaw direction or a steering angle of the movable body is smaller than a predetermined threshold value.

6. The distance estimation device according to claim 1, wherein the calculating unit acquires the distance between the two ground objects based on the distances to the two ground objects and angles formed by a traveling direction of the movable body and respective directions to the two ground objects from the moveable body.

7. The distance estimation device according to claim 1, wherein the calculating unit acquires the distance between the two ground objects based on map information.

8. The distance estimation device according to claim 1, wherein the calculating unit changes a time interval from the first time to the second time in accordance with a traveling speed of the movable body.

9. The distance estimation device according to claim 8, wherein the calculating unit makes the time interval shorter as the traveling speed of the movable body becomes higher.

10. A distance estimation method executed by a distance estimation device
   comprising: a process configured to detect at least three ground objects; an acquiring process configured to acquire a first distance group and a second distance group including distances from a movable body at a first time and a second time to the at least three ground objects and a third distance group including distances between the at least three ground objects; and
   a calculating process configured to calculate a moving distance of the movable body from the first time to the second time based on the distances from the movable body to the ground objects and the distances between the ground objects, wherein the moving distance of the movable body is calculated with respect to two ground objects that are specified based on the distances from the movable body to the at least three ground objects or the distances between the at least three ground objects.

11. A non-transitory computer-readable medium storing a program executed by a distance estimation device comprising a computer, the program causing the computer to
   function as: a device configured to detect at least three ground objects; an acquiring unit configured to acquire a first distance group and a second distance group including distances from a movable body at a first time and a second time to the at least three ground objects and a third distance group including distances between the at least three ground objects; and
   a calculating unit configured to calculate a moving distance of the movable body from the First time to the second time based on the distances from the movable body to the ground objects and the distances between the ground objects, wherein the moving distance of the movable body is calculated with respect to two ground objects that are specified based on the distances from the movable body to the at least three ground objects or the distances between the at least three ground objects.

* * * * *